Jan. 7, 1947.　　　　F. A. RAMSDELL　　　　2,413,996
APPARATUS FOR MAKING STEREO PICTURES
Filed Feb. 5, 1944　　　　2 Sheets-Sheet 1
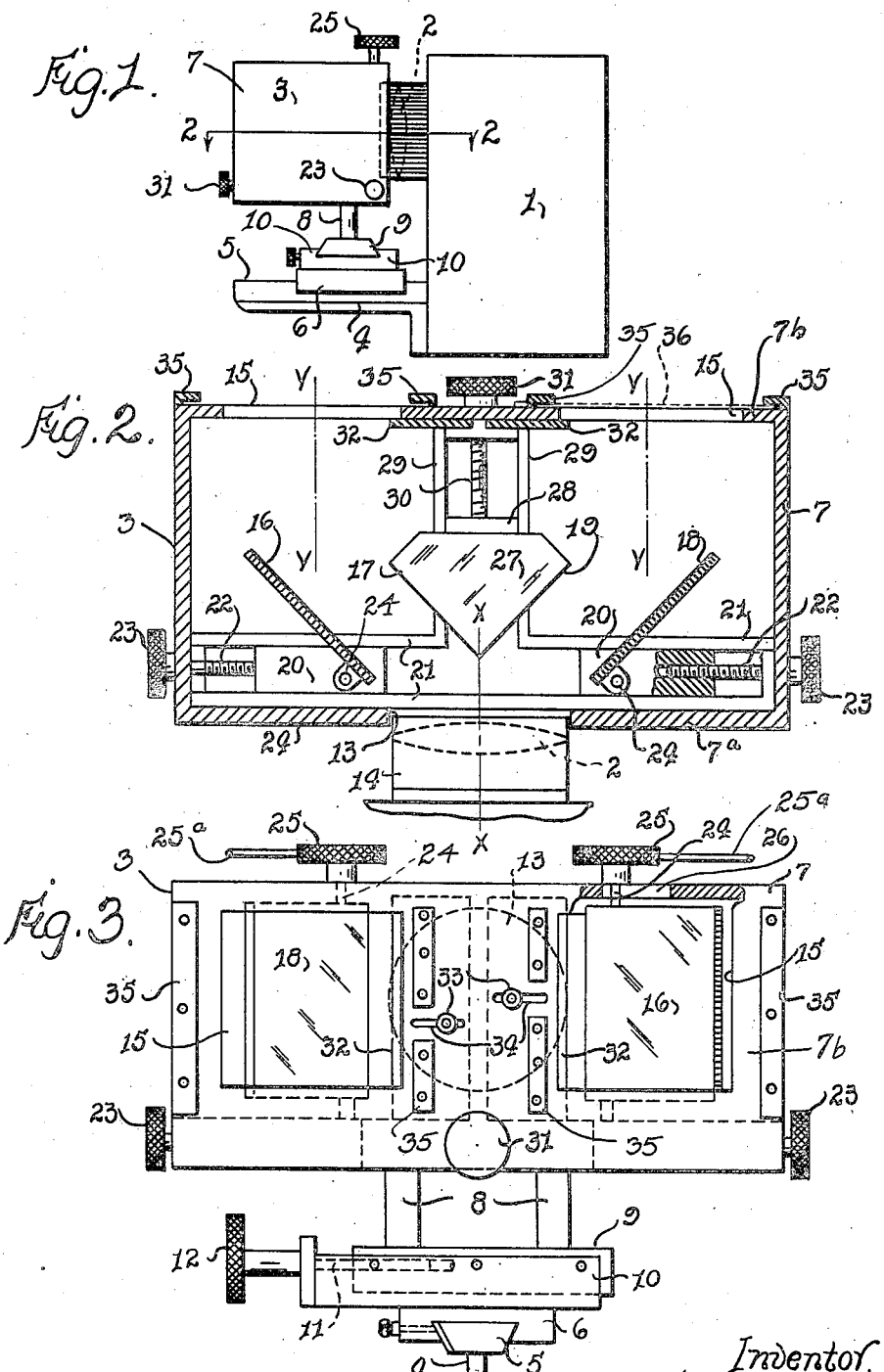

Patented Jan. 7, 1947

2,413,996

UNITED STATES PATENT OFFICE 2,413,996

APPARATUS FOR MAKING STEREO-
PICTURES

Floyd A. Ramsdell, Worcester, Mass., assignor to
Worcester Film Corporation, Worcester, Mass.,
a corporation of Massachusetts Application February 5, 1944, Serial No. 521,162

5 Claims. (Cl. 95—18)

The present invention relates to stereophotography and has for its object to provide improved apparatus for making pictures which create upon observation a three-dimensional or stereoscopic effect.

The invention is embodied in an attachment for use in connection with single lens cameras, with the attachment providing pairs of reflecting elements disposed at such relative angles as to laterally displace separate groups of rays received from the subject before passing through the camera lens. Thus rays from the subject being photographed, entering the attachment through outer apertures spaced apart a distance substantially corresponding to the average interocular distance, are brought close enough together to be passed through a single objective lens. In this way the film receives projected images in so-called stereoscopic pairs, as shown and described in my Patent No. 2,329,294, issued September 14, 1943, for Apparatus for projecting stereopictures.

Briefly stated, the present invention provides an improved attachment of the above indicated character, whereby stereoscopically related images may be simultaneously produced in side-by-side relation on the camera film, subject to widely varying conditions under which a subject may be photographed. In order to permit its use with different types of cameras, the attachment of the present invention also provides means readily accessible to the operator of the camera for making various adjustments to suit differing characteristics of said cameras. Specifically, the attachment provides adjustments for properly centering and framing images of the subject being photographed with reference to each half of the divided field, as well as for variably controlling the relative positions of the reflectors, to meet different stops or openings at which the camera may be operated. Furthermore, the attachment provides means for varying the degree of offset or "interocular" between the separate images, with additional means to line up the axis of the attachment, as a whole, with respect to the optical axis of the camera lens.

The above and other advantages features of the invention will hereinafter more fully appear from the following description considered in connection with the accompanying drawings, in which—

Fig. 1 is a view in side elevation of the attachment as applied to a camera.

Fig. 2 is a horizontal sectional view along the line 2—2 of Fig. 1, showing the construction of the attachment on an enlarged scale.

Fig. 3 is a view in front elevation of the attachment as viewed from the left in Fig. 1.

Figure 4:
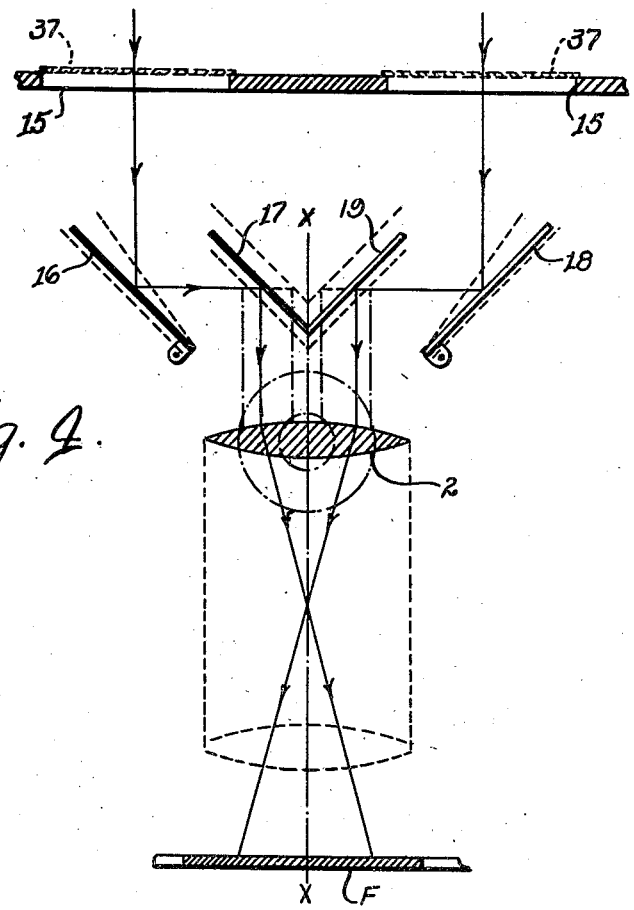
Fig. 4 is a diagram graphically illustrating the passage of groups of rays through the attachment and the objective lens, in according with different adjustments of the attachment.

Referring first to Fig. 1, the invention is shown for purposes of illustration as being applied to a camera 1 of usual construction, only the essential parts of which are shown. The camera 1 provides an objective lens 2 indicated in dotted lines, with the lens 2 having associated therewith the usual adjustments for focusing and controlling the size of the opening through which light rays are admitted to the lens. In other words, the lens 2 may be considered as being of the variable-focus and variable stop type, customarily used in profressional photography.

The present invention contemplates the provision of an attachment 3 adapted to be mounted in front of the camera 1 so as to cover the end of the lens 2. For the purpose of supporting the attachment 3, the base of the camera provides a forwardly extending bracket 4 having a slide 5 for supporting a base 6 on which the attachment 3 is mounted. As best shown in Figs. 2 and 3, the attachment 3 comprises a rectangular casing 7 providing downwardly extending posts 8 for supporting the casing on a plate 9. The plate 9 is slidably received between ways 10 provided by the base 6, and the entire attachment can be shifted laterally with respect to the fixed bracket 4 by means of an adjusting screw 11 providing an operating knob 12.

The rear wall 7a of the casing 7 provides an opening 13 that is circular in form, as indicated in dotted lines in Fig. 3. By moving the base 6 of the attachment on the bracket slide 5, towards the camera, the opening 13 can be caused to receive the end of a cylindrical lens mounting or tube 14 provided by the camera 1. As shown in Fig. 2, the opening 13 is of such diameter as to freely receive the lens tube 14, and after the attachment 3 has been initially positioned on the bracket, the opening 13 can be exactly centered with respect to the axis x—x of the lens 2 by turning the adjusting knob 12 of the screw 11 to cause lateral shifting of the entire attachment.

The front wall 7b of the casing 7 provides spaced openings or windows 15, with the central axes y—y of the openings 15 displaced a distance substantially equal to the average spacing of the human eyes from each other, commonly known as the interocular distance. The interior of the casing 7 provides pairs of spaced reflectors 16, 17 and 18, 19, respectively, which are symmetrically arranged with reference to the common axis x—x of the lens 2 and the opening 13, as adjusted.

As best shown in Fig. 4, the several reflectors 16, 17 and 18, 19 are shown diagrammatically as being so disposed with reference to the lens axis x—x that rays of light entering the openings 15 will be reflected, as indicated by the solid ray lines with arrows. These rays can be considered as generally indicating the behavior of bundles of light rays coming from the subject being photographed and entering the openings 15 substantially along the axes y—y. With the rays being reflected between the spaced reflectors 16, 17 and 18, 19, as shown, the rays will enter the lens 2 in substantially parallel relation and after passing therethrough and crossing, these rays will strike the film F at equal distances from the axis x—x. Consequently, a pair of images will be produced on the film F, which images will differ from each other to substantially the same degree as do the separate images recorded by the human eyes in viewing any subject, first, with one eye alone and then with the other, as a result of binocular vision, although the film images will be reversed.

Figure 5:
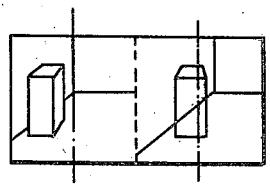
Fig. 5 illustrates the appearance of a pair of film images.

While, as previously pointed out, the distance between the central axes y—y of the openings 15 substantially corresponds to the average interocular distance of the human eye, the attachment provides means for bodily shifting the reflectors 16 and 18 with respect to the axes y—y so as to vary this distance, as regards the centers of the respective reflectors. To this end, each reflector 16 and 18 is mounted on a slide 20 movable between ways 21 extending at right angles to the lens axis x—x. Each slide 20, with its reflector, is movable back and forth between the ways 21 by means of a screw 22 provided with an operating knob 23 projecting beyond the end of the casing 7. By turning the knobs 23, the reflectors 16 and 18 can be shifted laterally with respect to the associated reflectors 17 and 19, without affecting the parallelism between the reflecting surfaces. By such adjustment, there can be obtained the effect of increasing or decreasing the "interocular," so that the projected images on the film F, viewed through the usual finder of the camera 1 as illustrated in Fig. 5, will exhibit an abnormal or subnormal stereoscopic effect at the will of the operator of the camera.

In order to vary the distance between the projected images on the film F, which images are centered about the intersection of the ray lines with the film, each reflector 16 and 18 is turnable about a pivot 24 extending vertically with respect to the slide 20. As best shown in Fig. 3, each pivot 24 extends through the casing 7 beyond which it is provided with an operating knob 25, providing an extension handle 25a. A slot 26 in the casing 7 permits turning of the pivot 24 to any position of the slide 20. By turning either reflector 16 or 18 about its pivot 24, either reflector can be turned, as indicated in dotted lines in Fig. 4, to vary the angle of incidence of the rays entering the openings 15. By such adjustment, the distance between the center lines of the projected images on the film F can be varied to permit the subject being centered with respect to its background. In other words, the camera operator, by turning the knobs 25, while viewing the subject through the finder, can cause the complete images to be shifted closer together or further apart.

In order to meet various lighting conditions, which may be encountered and which require the use of different diaphragm openings or "stops" for the lens 2, the attachment also provides means for simultaneously adjusting the inner reflectors 17 and 19. As best shown in Fig. 2, the reflectors 17 and 19 are carried by a block 27, the base of which is secured to a slide 28 movable between ways 29. It will be noted that the slide 28 is centered with respect to the lens axis x—x and the block 27 carrying the reflectors 17 and 19 can be shifted along this axis by means of an adjusting screw 30 providing an operating knob 31. By turning the knob 31, the two reflectors 17 and 19 can be moved in unison toward or away from the lens 2, as indicated in dotted lines in Fig. 4. Moving the reflectors 17 and 19 towards the lens 2 will have the effect of spreading the reflected rays around the lens axis, as when operating with a wide open stop (such as f 1.2). On the other hand, moving the reflectors 17 and 19 away from the lens 2 will have the effect of concentrating the reflected days upon the center of the lens 2, as when operating with a closed down stop (such as f 22). The dotted circles centered about the lens 2 in Figs. 4 illustrate different stop openings for the lens, and the dot and dash ray lines illustrate the passage of the rays to the lens with the reflectors 17 and 19 in their dotted line positions for different lens stops.

By reason of the above-described adjustment of the reflectors 17 and 19 for different lens stops, it is apparent that the attachment is adapted for use in connection with either wide-angle or narrow-angle lens. That is to say, with the reflectors 17 and 19 set in the forward dotted line position of Fig. 4, the attachment is adapted for use in connection with a wide-angle lens, since the dot and dash ray lines cross at a wider angle than the full ray lines. On the other hand, setting the reflectors 17 and 19 in the rearward dotted line position adapts the attachment for use in connection with a narrow-angle lens as indicated by the dot and dash ray lines. Therefore, the knob 31 provides the operator with means for setting up the relative positions of the reflectors 16, 17 and 18, 19 exactly in accordance with the stop and focus of the camera lens being used.

As previously pointed out, the attachment also provides means for variably framing the film images, to which end one side of each window 15 provides a plate 32 slidably held against the inside of the front wall by a screw 33. As best shown in Fig. 3, each screw 33 passes through a slot 34 in the wall, so that the plate 32 can be moved back and forth and held in different positions by tightening the screw 33. By means of the plates 32 and the previously described adjustments of the reflectors 16 and 18, as regards angle of incidence and interocular distance, the projected film images can be framed as desired with regard to the subject being photographed, as viewed in the finder of the camera.

Since under some conditions of photography, it may be desired to view the projected images independently of each other, the front of the attachment provides suitable pairs of spaced guides 35, 35 extending parallel to the window openings 15. Each pair of guides is adapted to slidably receive a mask 36, as indicated in dotted lines in Fig. 2, so that the projected images may be viewed independently on the finder.

The guides 35 may also be employed to mount sheets 37 of light-polarizing material in front of the windows 15, with the polarizers adapted to polarize light in axes at right angles to each other, as indicated by the dotted cross hatching in Fig. 4. Under some conditions of photography, such as "process shots" in moving picture practice, different subjects are photographed against a background screen on which pictures are being projected in depth. Under these conditions it is desirable to use polarizers on the attachments which may be in the form of sheets slidable in the guides 35. This is done in order that each "eye," as represented by a window 15, may pick up only that image on the background screen that corresponds to that eye.

From the foregoing then, it is apparent that by the present invention there is provided an attachment for use in connection with the making of stereoscopic pairs by a single lens camera. By reason of the adjustable mounting of the pairs of reflectors within the attachment, it is possible to obtain the projection of stereoscopically related images on the camera film under widely varying conditions as regards both the subject being photographed and the individual characteristics of the camera lens.

I claim:

1. Apparatus for making stereopictures comprising in combination, an attachment for mounting in front of the objective lens of a camera, said attachment providing an optical system consisting of two pairs of spaced reflectors for simultaneously transmitting stereoscopically related images for recording in side-by-side relation on the camera film, with one reflector of one pair being mounted adjacent to one reflector of the other pair, and means for shifting said adjacent reflectors in unison along the optical axis of said camera to accommodate the attachment for use in connection with different stops and focal lengths of the camera lens.

2. Apparatus for making stereopictures comprising in combination, an attachment for mounting in front of the objective lens of a camera, said attachment providing an optical system consisting of two pairs of spaced reflectors for simultaneously transmitting stereoscopically related images for recording in side-by-side relation on the camera film, with one reflector of one pair lying in a plane that intersects the plane of one reflector of the other pair at a point on the optical axis of said camera lens, and means for bodily shifting both of said reflectors in unison along said lens axis without disturbing the angular relation between said planes.

3. Apparatus for making stereopictures, comprising in combination an attachment for mounting in front of the objective lens of a camera, said attachment comprising a casing providing an opening for receiving one end of a camera lens and a pair of openings on opposite sides of the lens axis, an optical system located between the openings of said casing, consisting of two pairs of spaced reflectors normally in substantially parallel relation for simultaneously transmitting stereoscopically related images for recording in side by side relation on the camera film, a slide for mounting one reflector on each pair with a fixed angle therebetween, said slide being adjustable along the lens axis to shift said reflectors in unison and accommodate the attachment for use in connection with different stops and focal lengths of the camera lens, and a pair of slides for mounting the other reflectors, said slides being movable toward or away from each other in a direction at right angles to the lens axis to vary the distance between film images without disturbing the normal parallelism between said reflector pairs.

4. Apparatus for making stereopictures, comprising in combination an attachment for mounting in front of the objective lens of a camera, said attachment comprising a casing providing an opening for receiving one end of a camera lens and a pair of openings on opposite sides of the lens axis, an optical system located between the openings of said casing, consisting of two pairs of spaced reflectors normally in substantially parallel relation for simultaneously transmitting stereoscopically related images for recording in side by side relation on the camera film, a slide for mounting one reflector on each pair with a fixed angle therebetween, said slide being adjustable along the lens axis to shift said reflectors in unison and accommodate the attachment for use in connection with different stops and focal lengths of the camera lens, and a pair of slides for mounting the other reflectors, said slides being movable toward or away from each other in a direction at right angles to the lens axis to vary the distance between film images without disturbing the normal parallelism between said reflector pairs, with said attachment being adjustable, as a whole, with respect to the camera to bring the axis of said reflector system into coincidence with the camera lens axis.

5. Apparatus for making stereopictures, comprising in combination an attachment for mounting in front of the objective lens of a camera, said attachment comprising a casing providing an opening for receiving one end of a camera lens and a pair of openings on opposite sides of the lens axis, an optical system located between the openings of said casing, consisting of two pairs of spaced reflectors for simultaneously transmitting stereoscopically related images for recording in side by side relation on the camera film, with the average intercolular distance therebetween, a slide for mounting one reflector on each pair with a fixed angle therebetween, said slide being adjustable along the lens axis to shift said reflectors in unison and accommodate the attachment for use in connection with different stops and focal lengths of the camera lens, and a pair of slides for mounting the other reflectors, said slides being movable toward or away from each other in a direction at right angles to the lens axis to vary the distance between film images to obtain an abnormal or subnormal stereoscopic effect with reference to the said average interocular distance.

FLOYD A. RAMSDELL.